United States Patent [19]

Bajric et al.

[11] Patent Number: 5,582,392
[45] Date of Patent: Dec. 10, 1996

[54] WIRE STRINGING DEVICE

[75] Inventors: Suad Bajric, Etobicoke; Alp Batur, Mississauga; Dominic Burns, Whitby; John F. Faulkner; Ljubisa Sandovski, both of Brampton; Rene Sonnenschein, Whitby; Howard D. Stanleigh, Thornhill, all of Canada

[73] Assignee: Canus Supply Co. Ltd., Mississauga, Canada

[21] Appl. No.: 352,702

[22] Filed: Dec. 5, 1994

[51] Int. Cl.⁶ .................................................. H02G 1/08
[52] U.S. Cl. .................................. 254/134.3 R; 124/27; 124/40; 254/134.3 FT
[58] Field of Search .................. 254/134.3 R, 134.3 FT; 124/26, 27, 28, 29, 31, 40; 15/104.33; 362/110; 42/70.01, 70.06, 70.07

[56] References Cited

U.S. PATENT DOCUMENTS

| | | | |
|---|---|---|---|
| 1,124,726 | 1/1915 | Gray | 124/27 |
| 1,297,344 | 3/1919 | Glass | 124/26 |
| 2,000,146 | 5/1935 | Penn | 43/6 |
| 2,348,040 | 5/1944 | Vieths | 124/27 |
| 2,597,565 | 5/1952 | Chandler et al. | 362/110 |
| 2,779,323 | 1/1957 | Thomsen | 124/27 |
| 2,888,768 | 6/1959 | Taylor | 42/114 |
| 2,939,449 | 6/1960 | Kortick | 124/27 |
| 2,955,586 | 10/1960 | Hamrick | 124/57 |
| 3,004,533 | 10/1961 | Ritz | 124/27 |
| 3,026,864 | 3/1962 | Gray | 124/27 |
| 3,059,630 | 10/1962 | Oreskey | 124/27 |
| 4,030,221 | 6/1977 | Doobenen et al. | 42/70.07 |
| 4,056,859 | 11/1977 | Pace | 7/107 |
| 4,785,568 | 11/1988 | Wang | 43/19 |
| 4,962,747 | 10/1990 | Biller | 124/40 |
| 5,360,291 | 11/1994 | Shimizu | 254/134.3 R |

*Primary Examiner*—Robert C. Watson
*Assistant Examiner*—Thomas W. Lynch
*Attorney, Agent, or Firm*—Arne I. Fors; Jeffrey T. Imai; Dale E. Schlosser

[57] ABSTRACT

A wire stringing device which comprises a barrel having a cylindrical bore which is closed at one end and open at the other end, a handle depending from said barrel, a compression spring disposed within the bore in proximity to the closed end, a projectile insertable into the bore whereby when the projectile is within the bore the spring is compressed against the closed end of the bore, the projectile adapted for attaching a flexible line thereto, a trigger adapted for engaging the projectile and maintaining the projectile within the bore and for releasing the projectile in response to finger pressure, whereby the projectile and the flexible wire may be projected from the device, and an adjustable compression member axially movable within the bore adjacent the closed end of the bore for adjusting the compression of the spring. The device may comprise a safety latch for locking the projectile in the barrel.

11 Claims, 3 Drawing Sheets

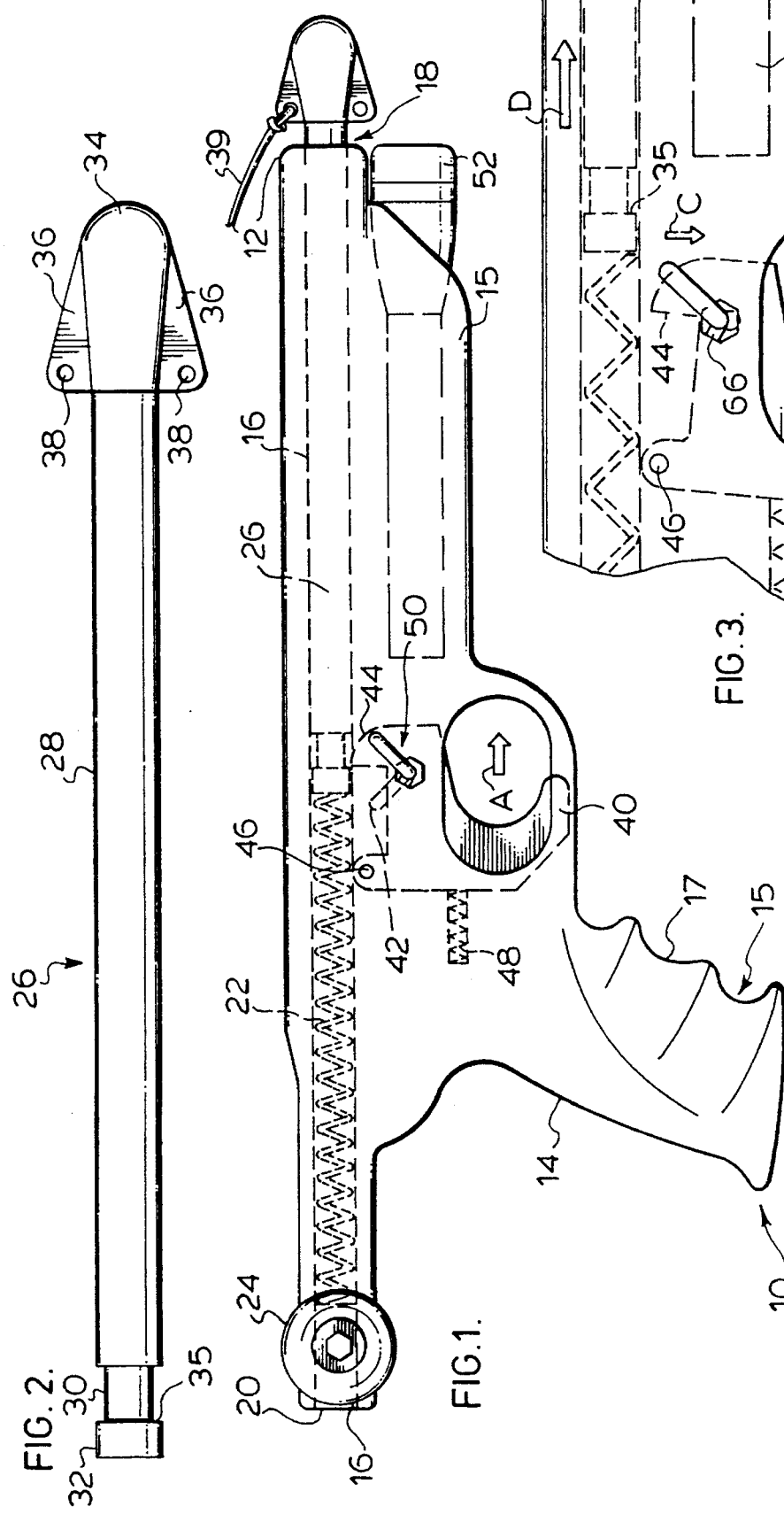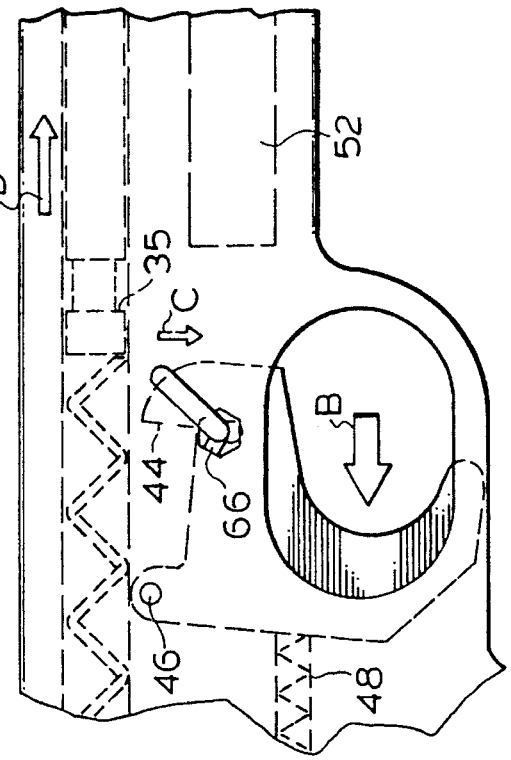

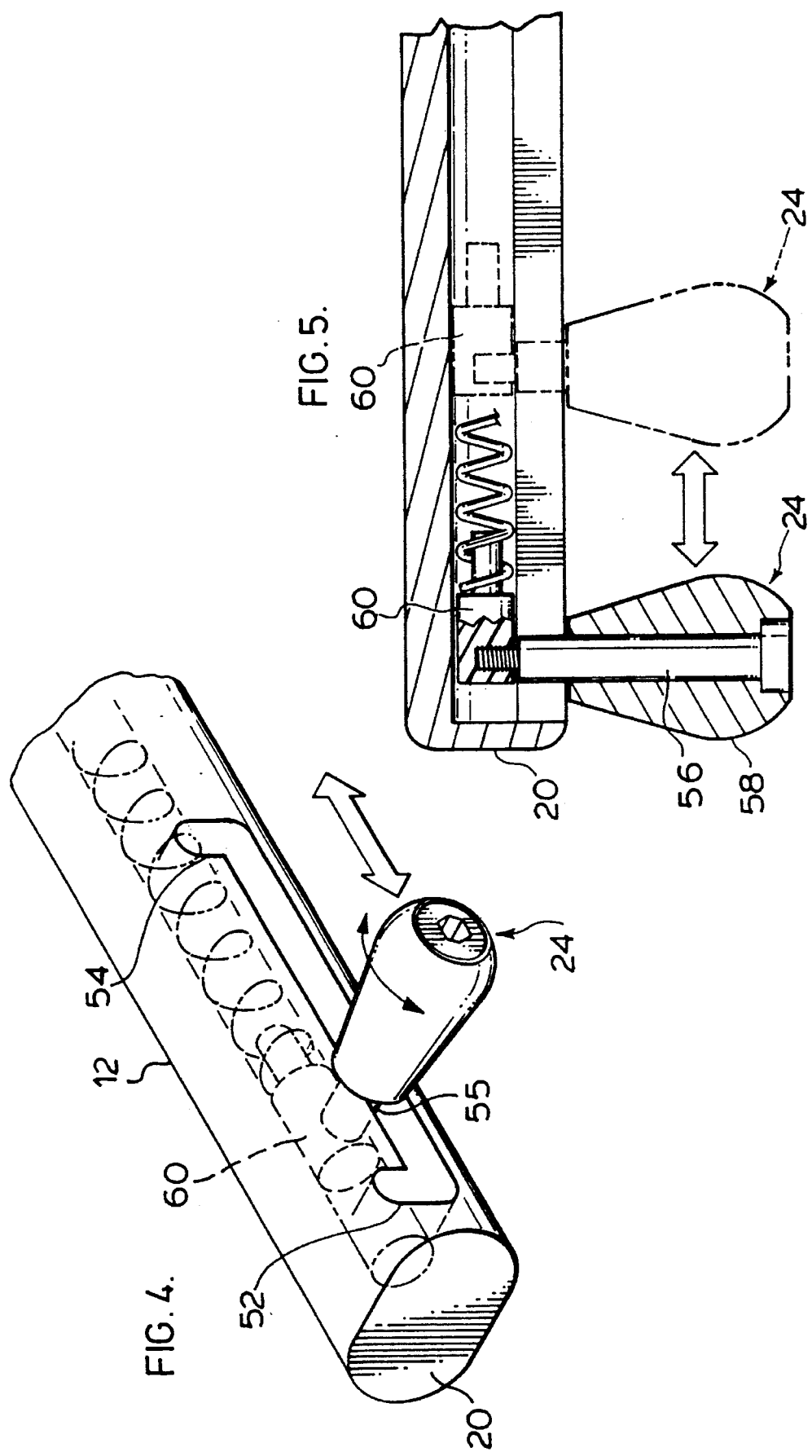

5,582,392

WIRE STRINGING DEVICE

FIELD OF INVENTION

This invention relates to a spring loaded tool and, more particularly, relates to a hand-held spring loaded, wire stringing device or tool adapted to propel a rod or like projectile to a certain destination.

BACKGROUND OF THE INVENTION

Spring loaded devices for propelling projectiles such as rods inserted within the devices may be used for various purposes. For example, such devices are commonly used by electricians to aid in the installation of wire or cable at worksites. Electrical wire, telephone wire or other types of wiring often require installation over relatively lengthy worksites. For example, it is often necessary to install wires or cables behind walls, over suspended ceilings, or through openings too narrow for workmen. A wire or thin cable is attached to the projectile within the device and is dispensed as the projectile is propelled towards its destination.

A drag line may first be propelled by wire stringing devices. Wire or cable may then be attached to the drag line and strung to the desired location. Thin wire, however, may be propelled by wire stringing devices without first propelling a drag line.

U.S. Pat. No. 4,056,859 by Pace discloses a spring loaded wire stringing device which propels a dart. The dart carries a fine wire to the desired location. The wire is stored in a dispenser above the barrel of the device until the dart with the wire attached is propelled to the desired location. The device also includes a cutter for cutting the wire after the dart has been propelled to the desired location.

Spring loaded devices are used for projecting a variety of projectiles such as spears as shown in U.S. Pat. No. 3,026,864 by Gray. A spear gun with a safety latch is disclosed in U.S. Pat. No. 3,026,864 which maintains the gun in a cocked position until the safety latch is relieved.

These prior art wire stringing devices do not allow adjustment of the compression of the compression spring, the conventional power source used for propelling the projectile, and at the same time provide a safety catch.

SUMMARY OF THE INVENTION

The disadvantages of the prior art may be overcome by providing a spring loaded wire stringing device which has an adjustable spring mechanism for propelling a projectile a variable predetermined distance from within the device.

In its broad aspect, the wire stringing device of the invention comprises a barrel having a cylindrical bore which is closed at one end and open at the other end for receiving a projectile, a handle depending from the barrel, a compressible spring within the bore in proximity to the closed end, and a projectile insertable into the bore whereby when the projectile is inserted within the bore, the spring is compressed against the closed end of the bore. The projectile is adapted for attaching a flexible line thereto. A trigger is adapted for engaging the projectile and maintaining the projectile a fixed distance within the bore and for releasing the projectile in response to finger pressure whereby the projectile and the flexible wire are projected from the device. An adjustable compression means is movable within the bore for adjusting the compression of the spring.

The projectile may be a rod and the device may additionally comprise a safety latch for locking the projectile within the barrel.

In the preferred embodiment, the trigger has detent means insertable within an annular recess in the rod projectile for engaging the rod shoulder and maintaining the rod within the barrel.

Also in the preferred embodiment, the adjustable compression means comprises a stud disposed within the bore adjacent the closed end of the bore, and manually actuable means attached to the stud for selectively locking the stud in a rear position or a forward position to adjust the compression of the compression spring.

The device may propel a drag line first to the desired location. Heavier wire or cable may then be attached to the drag line and manually pulled to the desired location. Thin wire may itself be propelled to the desired location by attachment to the projectile.

BRIEF DESCRIPTION OF THE DRAWINGS

The present invention will now be described in detail with reference to the accompanying drawings, in which:

FIG. 1 is a cross-sectional side elevational view of the device of the invention having a projectile loaded therein;

FIG. 2 is an enlarged side view of the projectile of the invention;

FIG. 3 is an enlarged fragmentary cross-sectional side elevational view of the trigger of the invention;

FIG. 4 is a fragmentary perspective view of the adjustable compression unit of the invention;

FIG. 5 is a top cross-sectional view of the adjustable compression unit of the invention;

DETAILED DESCRIPTION OF THE PREFERRED EMBODIMENT

Figure 7:
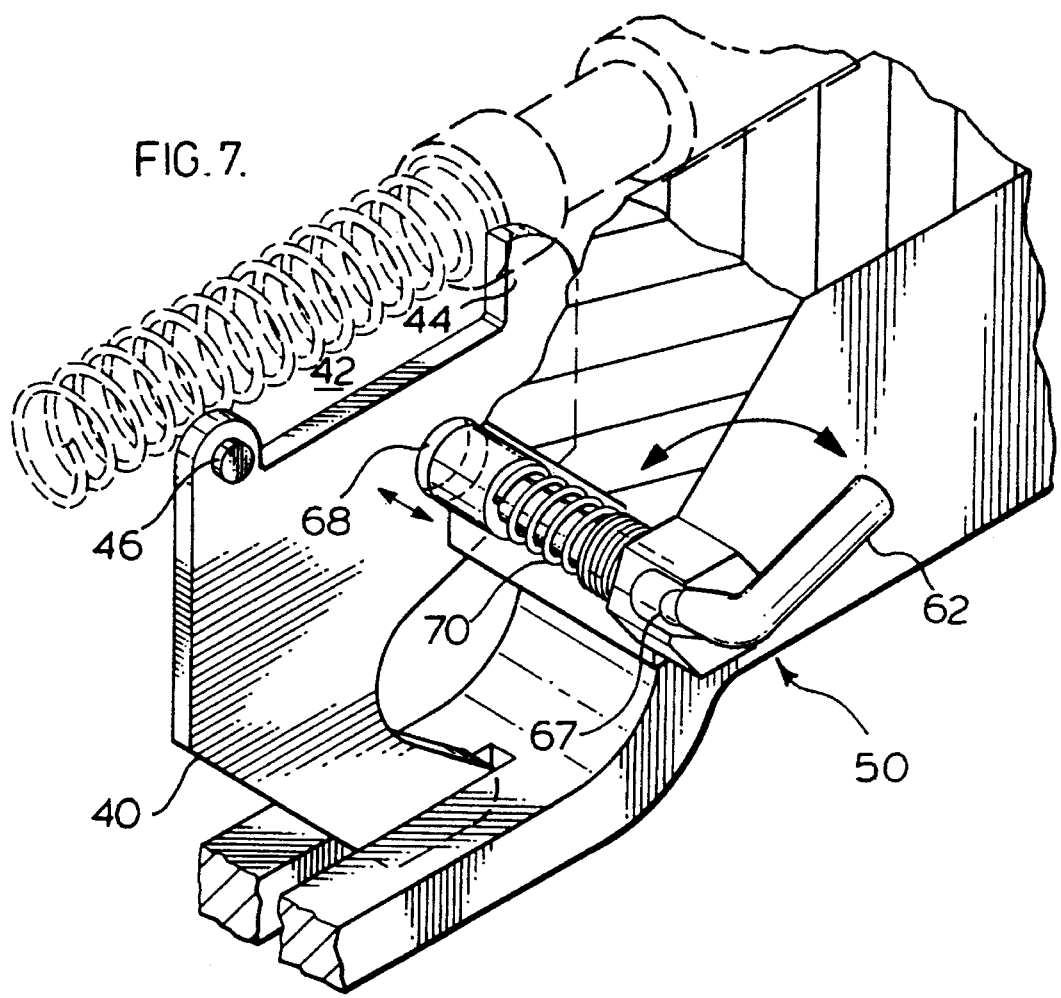
FIG. 7 is a fragmentary perspective of the safety latch of FIG. 6.

Referring first to FIG. 1, the wire stringing device of the invention is depicted by numeral 10. The wire stringing device 10 may be comprised of metal or plastic. The body of the device 10 is comprised of two longitudinal opposite halves which may be attached to each other by screws passing through mating apertures within opposite halves (not shown) or other similar attachment means.

The wire stringing device 10 includes a barrel 12 which has a handle or hand grip 14 depending below the barrel 12 and handle extension 15. The hand grip 14 includes recesses 17 for the gripping of the hand grip 14 by the user. The barrel 12 has an inwardly extending cylindrical bore 16 from the outer open end 18 to the closed end 20. A compression spring 22 is disposed within the bore 16. The spring 22 rests against the adjustment member 24 within the bore 16, to be described.

A rod projectile 26 is insertable into the bore 16 of the barrel 12 as shown in FIG. 1. FIG. 2 shows the rod 26 in detail. The rod may be comprised of plastic or metal. Generally, if the body of the device 10 is comprised of plastic, a plastic rod 26 will be used. If the body of the device 10 is comprised of metal, a plastic or metal rod 26 may be used. The rod 26 has an elongated cylindrical shaft 28. Adjacent the rear end 32 of the shaft 28 is an annular recess 30 which provides an annular shoulder 35. The end member 32 is of the same diameter as the shaft 28. The opposite end, i.e. the front 34 of the rod 26, has a flight 36 attached to it to aid in the aerodynamics of the travel of the rod 26. The end 34 of the rod 26 terminates in a slightly bulbous shape which is larger than the diameter of the shaft 28. The flight 36 has two apertures 38 on either side of the flight 36.

A wire 39 may be attached to the rod 26 by inserting it within an aperture 38. The wire 39 may be dispensed by a spool or similar apparatus located on the wire stringing device 10 (not shown) or may be dispensed separate from the wire stringing device 10. A drag line may first be propelled along with the rod 26 to the desired destination. Wire or cable or whatever is desired to be installed may then be attached to the drag line and then manually pulled to the destination.

As shown in FIG. 1, when the rod 26 is inserted into the bore 16 of the barrel 12, the spring 22 is compressed against the adjustment member 24. The rod 26 is locked in the cocked position within the wire stringing device 10 by a trigger 40. Safety latch 50 maintains the rod 26 in a cocked position when it is engaged. The trigger 40 has a recess 42 and a detent member 44. The detent member 44 projects into the bore 16 of the barrel 12. The fight 36 of the rod 26 remains outside the barrel 12 of the wire stringing device 10 when it is in the cocked position.

As shown in FIGS. 1, 3 and 7, the trigger 40 is pivotally mounted within wire stringing device 10 by pin 46 which extends between the halves of the wire stringing device 10. Detent member 44 enters the annular recess 30 and engages the shoulder 35 of the end member 32 of the rod 26 for maintaining the rod 26 and compression spring 22 in the cocked configuration. The trigger 40 is biased in the direction shown by arrow A in FIG. 1 by compression spring 48 which is contained within a recess in the handle 14. The biasing of trigger 40 in the direction shown by arrow A urges detent member 44 into the bore 16 of the barrel 12 to engage end member 32.

Once the safety latch 50 has been disengaged, finger pressure upon the trigger 40 compresses the spring 48, as shown by arrow B in FIG. 3, and pivots the detent member 44 in the direction shown by arrow C to release the rod 26 in the direction shown by arrow D.

In the preferred embodiment, a flashlight 52 is inserted into an aperture in the handle extension parallel with the axis of bore 16 to aid in the stringing of wire 39 across suspended ceilings of unfinished worksites or other dark places where wire or cable is to be strung. Any commercially available flashlight may be used as long as it fits within the aperture for snug placement of the flashlight.

FIGS. 4 and 5 show the longitudinal adjustment of the adjustment member 24 within the bore 16 of the barrel 12. A bolt 56 within the knob 58 of adjustment member 24 connects adjustment member 24 to stud 60 which is slidably mounted within the bore 16 of the barrel 12. The bolt 56 is threaded into stud 60. The adjustment member 24 may be slidably moved within the bore 16 to one of two positions in the preferred embodiment. The first position of the adjustment member 24 at the rear end of bore 16 is shown in FIG. 1 and FIG. 5. The second or forward position of the adjustment member 24 is depicted by ghost lines in FIG. 5. When the adjustment member 24 is in its second position, the spring 22 is further compressed than when the adjustment member is in its first position upon insertion of rod 26 within the bore 16 of the barrel 12. The barrel 12 has rear slot 52 and forward slot 54 (FIG. 4) adapted to receive the shank 55 of the adjustment member 24 to axially locate stud 60 and thus vary the degree of compression of the spring 22. It will be understood that additional slots may be included in the barrel 12 for receiving the shank 55 of the adjustment member 24 to vary the degree of compression of the spring 22.

Figure 6:
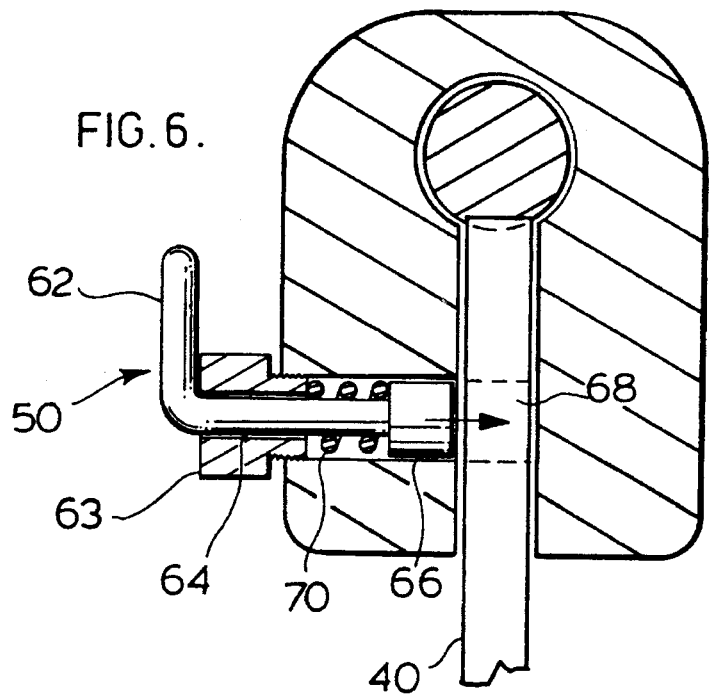
FIG. 6 is a vertical cross-sectional end view of the safety latch of the invention.

FIGS. 6 and 7 show the safety latch 50 in more detail. The safety latch 50 has a handle 62 on the outer end. The handle 62 has shank extension 64 which is contained within the body of the wire stringing device 10 and which is perpendicular to the handle 62. The extension 64 terminates with stud 66 which is insertable into an aperture 68 in the trigger 40 to lock trigger 40 from pivotal movement about pin 46. Compression spring 70 inserted about and concentric with extension 64 is anchored by collar 63 threaded into handle 14 through which extension 64 projects. Collar 63 has a notch 67 into which handle 62 can be twisted to allow compression spring 70 to urge shank extension 64 axially forward so that stud 66 engages aperture 68 to lock trigger 40.

Operation

The operation of the wire stringing device 10 will be described with reference to FIGS. 1–7. In operation, projectile rod 26 having wire or cord 39 is forcibly inserted into bore 16 of barrel 12 to compress spring 22. Detent member 44 of trigger 40 enters annular recess 30 of rod 26 to engage shoulder 35 of end 32. Handle 62 of safety latch 50 is twisted to allow handle 62 to enter notch 67 in collar 63. This allows shank extension 64 to move axially forward so that stud 66 enters trigger aperture 68 to lock the trigger 40 and prevent actuation of the device.

The degree of compression of spring 22 can be selectively adjusted by moving adjustment member 24 from the first or rearmost position shown in FIG. 1 to the second position shown by ghost lines in FIG. 5 to increase the compression of spring 22, and hence to increase the distance which the rod 26 may be propelled.

Handle 62 of safety latch 50 can then be retracted to remove stud 66 from trigger aperture 68 when it is desired to actuate the device. The user may then depress the trigger 40 by finger pressure to compress spring 48. Detent member 44 pivots in the direction shown by arrow C in FIG. 3 to release rod 26. Rod 26 is then propelled by the spring 22 to the desired destination.

In the preferred embodiment, when the adjustment member 24 is in the first position at the rear end of bore 16 as shown in FIG. 1 and FIG. 5, and the device 10 and rod 26 are comprised of plastic, the rod 26 is propelled 20–25 feet, depending on the weight of the wire 39. When the adjustment member 24 is in its second or forward position as shown by ghost lines in FIG. 5, the rod 26 may be propelled up to 45 feet, again depending on the weight of the wire 39.

It will be understood that modifications can be made in the embodiments of the invention described herein without departing from the scope and purview of the invention as defined by the appended claims.

I claim:

1. A wire stringing device comprising:

a barrel having a cylindrical bore which is closed at one end and open at the other end, said barrel having a first notch adjacent said closed end of said bore and a second notch disposed forwardly from said first notch;

a handle depending from said barrel;

a compression spring disposed within said bore in proximity to the closed end;

a projectile insertable into said bore whereby when said projectile is within said bore said spring is compressed against the closed end of said bore, said projectile adapted for attaching a flexible wire thereto;

a trigger adapted for engaging said projectile and maintaining said projectile within said bore and for releasing said projectile in response to finger pressure; whereby said projectile and said flexible wire may be projected from the device; and adjustable compression means axially movable within said bore adjacent the closed end of the bore for adjusting the compression of said spring, said adjustable compression means comprising a stud disposed within said bore adjacent the closed end of the bore, and manually actuated means attached to said stud for selectively locking said stud in a rear position when said manually actuated means is within said first notch or a forward position when said manually actuated means is within said second notch to adjust the compression of the compression spring; and a safety latch for locking said projectile within said barrel.

2. A wire stringing device as claimed in claim 1 wherein said projectile has a flight having at least one aperture, said flight proximate one end of said projectile whereby said flexible wire is attached to said projectile.

3. A wire stringing device as claimed in claim 1 wherein said handle has a hand grip.

4. A wire stringing device as claimed in claim 1 wherein said projectile is an elongated cylindrical rod.

5. A wire stringing device as claimed in claim 4 wherein said rod has an annular recess proximate one end defining a shoulder.

6. A wire stringing device as claimed in claim 5 wherein said trigger has detent means insertable within said rod annular recess for engaging the rod shoulder and maintaining said rod within said barrel.

7. A wire stringing device as claimed in claim 6 additionally comprising biasing means for urging said detent means into said bore to engage said rod.

8. A wire stringing device as claimed in claim 1 wherein said safety latch comprises biasing means for urging a stud within an aperture in said trigger for locking said trigger.

9. A wire stringing device as claimed in claim 1 additionally comprising an aperture in said handle below said bore wherein a flashlight may be inserted.

10. A wire stringing device as claimed in claim 1 wherein said device is comprised of plastic.

11. A wire stringing device as claimed in claim 1 wherein said device is comprised of metal.

* * * * *